United States Patent
Koseki et al.

(10) Patent No.: US 8,873,113 B2
(45) Date of Patent: Oct. 28, 2014

(54) IMAGE READING APPARATUS AND RELATED METHODS

(71) Applicant: Toshiba Tec Kabushiki Kaisha, Tokyo (JP)

(72) Inventors: Naoya Koseki, Shizuoka (JP); Mitsuru Hatano, Kanagawa (JP); Sueo Ueno, Shizuoka (JP); Hiroyuki Shiraishi, Shizuoka (JP); Yusuke Hashizume, Chiba (JP); Katsuya Nagamochi, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/783,164

(22) Filed: Mar. 1, 2013

(65) Prior Publication Data

US 2013/0235437 A1 Sep. 12, 2013

Related U.S. Application Data

(60) Provisional application No. 61/607,430, filed on Mar. 6, 2012.

(51) Int. Cl.
 *H04N 1/04* (2006.01)
 *H04N 1/48* (2006.01)
 *H04N 1/60* (2006.01)
 *G03G 9/00* (2006.01)
 *H04N 1/40* (2006.01)

(52) U.S. Cl.
 CPC ............. *H04N 1/6094* (2013.01); *H04N 1/482* (2013.01); *G03G 9/00* (2013.01); *H04N 1/40012* (2013.01)
 USPC ............ 358/475; 358/474; 358/509; 382/275

(58) Field of Classification Search
 CPC ... H04N 1/6094; H04N 1/002; H04N 1/0002; H04N 1/4076; H04N 1/3871; H04N 1/62; G06F 3/041
 USPC ......... 358/505, 518, 475, 509, 488, 448, 530, 358/1.9; 382/167, 275, 254
 See application file for complete search history.

(56) References Cited

U.S. PATENT DOCUMENTS

| | | | | |
|---|---|---|---|---|
| 5,737,665 | A * | 4/1998 | Sugiyama et al. | 399/39 |
| 6,118,557 | A * | 9/2000 | Sugiyama et al. | 358/504 |
| 6,538,768 | B2 * | 3/2003 | Shibahara et al. | 358/1.9 |
| 6,853,815 | B2 * | 2/2005 | Tezuka et al. | 399/39 |
| 7,071,979 | B1 * | 7/2006 | Ohtani et al. | 348/269 |
| 7,616,359 | B2 * | 11/2009 | Sekizawa et al. | 358/509 |
| 7,701,610 | B2 * | 4/2010 | Mikami | 358/1.9 |
| 7,787,121 | B2 * | 8/2010 | Tsujita et al. | 356/407 |
| 7,817,297 | B2 * | 10/2010 | Ushida et al. | 358/1.16 |

(Continued)

*Primary Examiner* — Negussie Worku
(74) *Attorney, Agent, or Firm* — Patterson & Sheridan LLP

(57) ABSTRACT

According to embodiments, an image reading apparatus and an image reading method are disclosed. The image reading method comprises receiving a signal of an image color of an image on an original, and based on the received signal, controlling an illuminating section comprising a red light source, a green light source and a blue light source so that one of the red, green and blue light sources is turned off, while the remaining light sources are turned on. The image reading method further comprises receiving, on an image sensor, light from the turned-on light sources that is reflected off of the original, and processing the light received by the image sensor to form a monochromatic image.

20 Claims, 4 Drawing Sheets

(56) References Cited

U.S. PATENT DOCUMENTS

| | | | |
|---|---|---|---|
| 7,864,386 B2* | 1/2011 | Tanimoto et al. | 358/496 |
| 7,916,366 B2* | 3/2011 | Utsunomiya | 358/518 |
| 7,990,576 B2* | 8/2011 | Fujiwara | 358/1.9 |
| 8,049,908 B2* | 11/2011 | Shoda | 358/1.13 |
| 8,144,375 B2* | 3/2012 | Tanimoto et al. | 358/474 |
| 8,179,569 B2* | 5/2012 | Kageyama et al. | 358/1.9 |
| 8,279,502 B2* | 10/2012 | Tsukahara | 358/475 |
| 8,335,023 B2* | 12/2012 | Tsukahara | 358/475 |
| 8,488,219 B2* | 7/2013 | Mikami | 358/475 |
| 8,508,778 B2* | 8/2013 | Tanimoto et al. | 358/1.15 |
| 8,576,417 B2* | 11/2013 | Tanaka et al. | 358/1.13 |
| 2010/0195171 A1 | 8/2010 | Ishido | |
| 2010/0296141 A1* | 11/2010 | Maruyama | 358/509 |

* cited by examiner

IMAGE READING APPARATUS AND RELATED METHODS

CROSS-REFERENCE TO RELATED APPLICATION

This application is based upon and claims the benefit of priority from U.S. provisional application 61/607,430, filed on Mar. 6, 2012; the entire contents of which are incorporated herein by reference.

FIELD

Embodiments described herein relate to an image reading apparatus of a multi-function peripheral (MFP). More particularly, embodiments described herein relate to a technology for accurately reading a printed image in a prescribed color.

BACKGROUND

In recent years, there have been proposed a technology whereby the image of text or picture or the like printed on a sheet or other recording media is formed on a coloring material that can erase the image. As the cycle of formation of image on the sheet made of an erasable coloring material and then erasure of the image is carried out repeatedly, a single sheet can be reused repeatedly in multiple rounds, so that it contributes to conservation of resources.

In order to enable erasure by the erasable coloring material, for example, blue color or other prescribed color may be used.

When an image sensor of an image reading apparatus is used to read an image, a light source emits light to illuminate the surface of the original, and the image is read. For the image forming apparatus, for the purpose of ecology, there is a type of image printed using a special toner that allows fixing at a lower temperature and erasure of the printed text or picture at a higher temperature. In order to recycle the paper sheet, the aforementioned toner uses a special color, such as blue color to ensure that the print is not remarkable in erasure.

Because the light source adopted in reading the blue image is a conventional light source (white light source) for read and it contains a blue color component, the read image become lighter. As this image data are converted to a monochromic image, the obtained image becomes even lighter.

DETAILED DESCRIPTION

According to an embodiment, an image reading apparatus is disclosed. The image reading apparatus comprises an illuminating section comprising a red light source, a green light source and a blue light source, each of which are configured to be turned on individually to illuminate a surface of a original, and a control section configured to control the light sources so that one of the red, green and blue light sources is turned off, while the remaining light sources are turned on. The image reading apparatus further comprises an operation section configured to signal the control section an image color of an image on the original, whereby the control section controls the light sources based on the image color of the original. The image reading apparatus further comprises an image processing section configured to process, into a monochromatic image, light from the turned-on light sources that is reflected off of the original and received by an image sensor.

According to additional embodiments, an erasing device is disclosed. The erasing device comprises an erasing section configured to erase an image printed with an erasable coloring material on an original. The erasing device further comprises an illuminating section comprising a red light source, a green light source and a blue light source, each of which are configured to be turned on individually to illuminate a surface of the original, and a control section configured to control the light sources so that one of the red, green and blue light sources is turned off, while the remaining light sources are turned on. The erasing device further comprises an operation section configured to signal the control section an image color of the image on the original, whereby the control section controls the light sources based on the image color of the original. The erasing device further comprises an image processing section configured to process, into a monochromatic image, light from the turned-on light sources that is reflected off of the original and received by an image sensor.

According to additional embodiments, an image reading method is disclosed. The image reading method comprises receiving a signal of an image color of an image on an original, and based on the received signal, controlling an illuminating section comprising a red light source, a green light source and a blue light source so that one of the red, green and blue light sources is turned off, while the remaining light sources are turned on. The image reading method further comprises receiving, on an image sensor, light from the turned-on light sources that is reflected off of the original, and processing the light received by the image sensor to form a monochromatic image.

In the following, the erasing device equipped with the image reading apparatus according to embodiments will be explained in detail with reference to the drawings.

Figure 1:
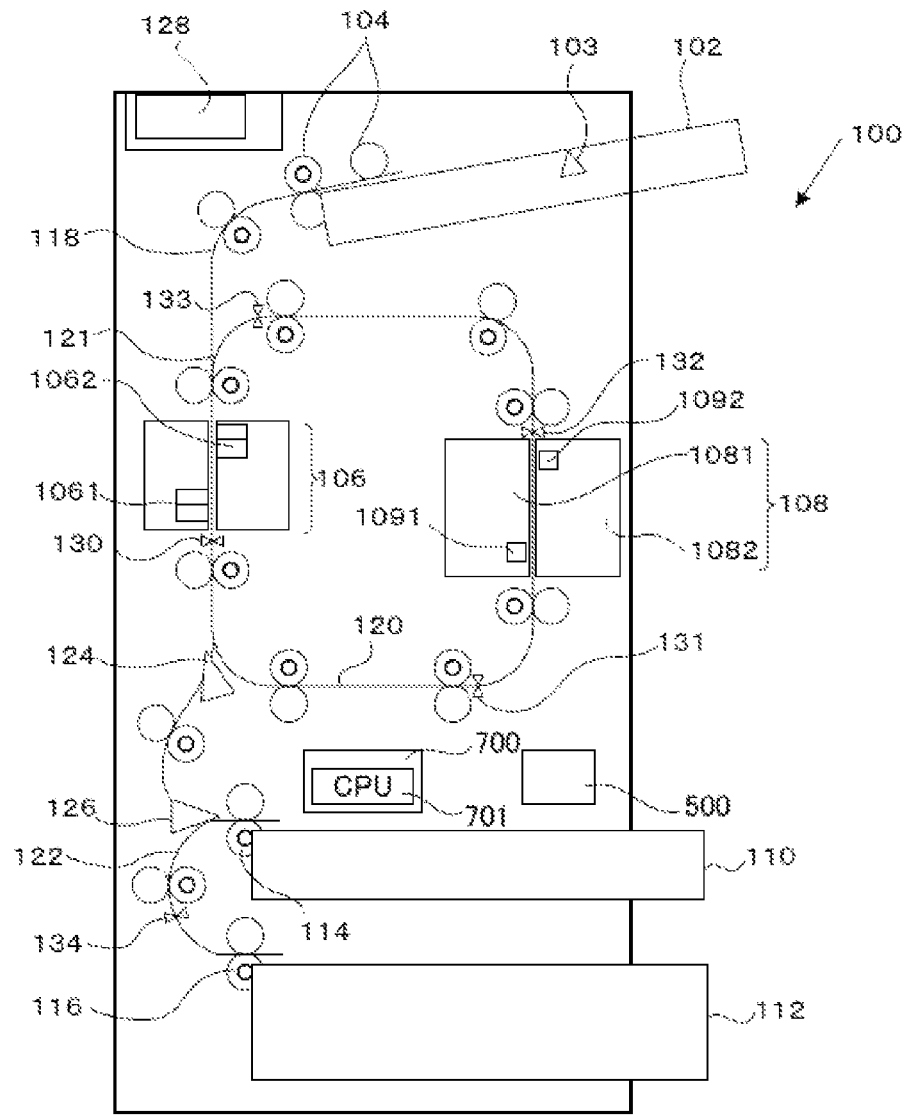
FIG. 1 is a schematic diagram illustrating the arrangement of an erasing device having an image read section according to an embodiment.

FIG. 1 is a schematic diagram illustrating the constitution of the erasing device. A erasing device 100 carries out "erasing processing" to erase the color of an image on the sheet where the image is formed by an erasable toner or an erasable ink or other erasable coloring materials." Examples of the erasing-capable coloring materials include the coloring compounds, developers, and erasing agents. Examples of the coloring compounds include leuco dyes and the like. Examples of the developers include phenols and the like. Examples of the erasing agents include the substances that are miscible with the coloring compounds when heated and don't have affinity with the developers. The erasable coloring material can be colored due to the interaction between the coloring compound and the developer, and, when it is heated to the erasing temperature or higher, as the interaction between the coloring compound and the developer is lost, it is discolored. In the following, the erasing-capable coloring material will simply be referred to as recording material.

The erasing device 100 has a paper feeding tray 102, a paper feeding member 104, a read section 106, an erasing section 108, a first tray 110, a second tray 112, discharge members 114 and 116, a first transporting passage 118, a second transporting passage 120, a third transporting passage 122, a first branching member 124, a second branching member 126, and an operation section 128.

The sheets for reuse are stacked in the paper feeding tray 102. The paper feeding tray 102 allows stacking of sheets in various sizes, such as A4, A3, B5 and the like. For the sheets stacked on the paper feeding tray 102, an image is formed on a recording material that can be erased when heated to over a prescribed temperature. The paper feeding member 104 has a pickup roller, a sheet supply roller, and separating roller arranged opposite to the sheet supply roller. It feeds the sheets stacked on the paper feeding tray 102, one sheet at a time from the top sheet, into the first transporting passage 118. The paper feeding tray 102 has a detecting sensor 103 (hereinafter to be referred to as paper feeding start sensor) that detects presence/absence of sheet on the paper feeding tray 102. For example, the paper feeding start sensor 103 may be a microsensor or a micro-actuator. As the paper feeding start sensor 103 detects the stacked sheet, the stacked sheet is fed according to the preset paper feeding mode. Control of the paper feeding is carried out by the CPU 701 of the paper feeding control section 700.

The first transporting passage 118 forms a sheet transporting passage from the paper feeding tray 102 to the first tray 110 and to the read section 106.

The read section 106 is arranged along the first transporting passage 118 downstream the sheet transporting direction with respect to the paper feeding tray 102. The read section 106 has, for example, CCD (Charge Coupled Device) scanner or CMOS sensor or other read unit.

According to the present embodiment, the read section 106 reads the images on the first surface and the second surface of the transported sheet. Here, the read section 106 includes a first read unit 1061 and a second read unit 1062 arranged along the first transporting passage 118. The transporting passage is sandwiched between the first read unit 1061 and the second read unit 1062, so that the read section 106 can read the images on both sides of the sheet being transported. The position where the read units (image reading apparatus) of the read section 106 read the images on the sheet is called the read position.

The images read by the first read unit 1061 and the second read unit 1062 are stored in the memory section 500. For example, as the image on the sheet read by the read section 106 before the erasing processing is stored in the memory system, when the erased image's data is needed later, it is possible to acquire the image data. In this case, as the plural sheets stacked on the paper feeding tray 102 are sequentially fed from the top sheet, it is hard to add sheets halfway in the paper feeding process. The plural sheets set as a stack are subject to the erasing processing as 1 unit. Here, the control section 200 (to be explained later) determines whether the sheet can be printed on with erasable toner or is reusable on the basis of the image read by the read section 106.

Downstream from the read section 106, there is the first branching member 124 as the switching section. The first branching member 124 can switch the transporting direction of the transported sheets. The first branching member 124 can transport the sheet being transported in the first transporting passage 118 to the second transporting passage 120 or to the first tray 110.

The second transporting passage 120 is branched from the first transporting passage 118 at the branch point where the first branching member 124 is arranged. The second transporting passage 120 that is branched from the branch point transports the sheet to the erasing section 108.

At the merging point 121 upstream in the sheet transporting direction from the read section 106, the second transporting passage 120 merges with the first transporting passage 118. That is, the second transporting passage 120 merges with the first transporting passage 118 at the merging point 121 between the paper feeding tray 102 and the read section 106.

Consequently, the second transporting passage 120 can transport the sheet that has been transported from the read section 106 again to the read section 106 via the erasing section 108. In other words, the erasing device 100 can control the first branching member 124 so that the sheet fed from the paper feeding member 104 is transported sequentially through the read section 106, the erasing section 108, and the read section 106.

The first transporting passage 118 includes a second branching member 126 downstream from the first branching member 124. The second branching member 126 guides the sheet that has been transported from the first branching member 124 to the first tray 110 or to the third transporting passage 122. The third transporting passage 122 transports the sheet to the second tray 112.

The erasing section 108 erases the color of the image of the transported sheet. For example, while in contact with the sheet being transported, the erasing section 108 heats the sheet to the prescribed erasing temperature so that it erases the color of the image made of the recording material. For example, the erasing section 108 in this embodiment has two erasing units 1081 and 1082 for erasing the first surface and the second surface of the sheet, respectively.

The erasing units 1081 and 1082 are arranged facing each other, with the second transporting passage 120 sandwiched between them. The erasing unit 1081 is in contact with the sheet from one side of the sheet to heat it. The erasing unit 1082 is in contact with the sheet from the other side of the sheet to heat it. That is, the erasing section 108 can erase the images formed on the two sides of the sheet being transported in a single round of operation.

The position where the sheet is heated by the erasing units 1081 and 1082, that is, the position of the heating section (not shown in the drawing) equipped in the erasing units 108a and 108b, is called the erasing position where heat is applied on the sheet being transported to erase the color of the images. The erasing section 108 has temperature sensors 1091 and 1092 that detect the temperatures of the heating sections of the erasing units 1081 and 1082, respectively. Each of the temperature sensors 1091 and 1092 may be a contact type or a non-contact type of sensor.

The operation section 128 arranged in the main body of the erasing device 100 has a touch panel-type display section and various types of operation keys. It is arranged on, for example, the upper portion of the erasing device itself. The operation keys include, for example, a number pad (ten-keys), a stop key, a start key, and the like.

According to this embodiment, paper feeding is carried out according to a paper feeding mode (to be explained later) for the sheets stacked on the paper feeding tray 102. The user carries out the operation for setting the paper feeding mode as explained above by the operating section 128, and instructs the functional operations of the erasing device 100, such as start of erasing or reading the image of the sheet to be erased, and the like.

The operation section 128 receives information about the color of the image printed on the sheet that is to be erased. Also, the operation section 128 displays the set information and the operation status of the erasing device 100, log information, and messages for the user.

Here, the operation section 128 is not limited to the type arranged in the main body of the erasing device 100. For example, it may also have an arrangement wherein operation can be carried out from the operation section of an external device connected to the erasing device 100 via a network. The operation section may also have an independent state with respect to the main body of the erasing device 100, and it carries out operation of the erasing device 100 by wired or wireless communication. Any type of the operation section may be adopted in the present embodiment as long as it can issue instruction of processing to the erasing device 100 and can read the information.

The discharge members 114 and 116 discharge the sheets to the first tray 110 and the second tray 112 arranged above and below the bottom of the main body, respectively. For example, the first tray 110 carries the sheets that have the image on the sheet discolored and can be reused. The second tray 112 carries the sheets that have been determined to be non-reusable. In the following, the first tray 110 will be called the reuse tray, while the second tray 112 will be called the reject tray. Here, the reuse tray 110 and the reject tray 112 can swap the sheets to accept by them, respectively. The types of the sheets to be stacked on the trays, that is, the transporting destination of the sheets, can be set from the operation section 128. By this setting, the second branching member 126 can switch the transporting passage to guide the sheet being transported to the first tray 110 or the third transporting passage 122.

The erasing device 100 has multiple sheet detecting sensors 130, 131, 132, 133, and 134 that detect the sheets being transported in the first transporting passage 118, the second transporting passage 120, and the third transporting passage 122, respectively. The sheet detecting sensors may be microsensors or micro-actuators. The sheet detecting sensors are arranged at the appropriate positions on the transporting passages.

In the separating processing, on the basis of the image read by the read section 106, the paper feeding control section 700 determines whether the sheet can be reused. For example, in the separating processing, the paper feeding control section 700 determines whether there is image on the sheet on the basis of the data read by the read section 106. If there is image, it cannot be reused. For example, when the sheet after the erasing processing in the erasing section 108 is read, if there is a residual image not erased, the control section 200 takes it as residue after erasing, and determines that it cannot be reused. In addition, in the separating processing, the paper feeding control section 700 determines a wrinkle depth and existence of folds, breakage or holes on the basis of the data read by the read section 106. If the wrinkle depth is larger than a prescribed value, or when there are folds, breakage or holes, the erasing device 100 determines that the sheet cannot be reused.

In the pre-separating processing, on the basis of the data read by the read section 106 before the erasing processing, the paper feeding control section 700 determines the reuse level of the image on the sheet. If the reuse level is over the prescribed level, the paper feeding control section 700 controls so that the erasing processing is not carried out, and the sheet is taken as non-reusable. Then, under control of the paper feeding control section 700, the sheet determined to be non-reusable is discharged to the reject tray 112. Also, the paper feeding control section 700 determines whether the image includes prohibiting data (which, when read prohibits erasing of the secret data) is are contained in the data of the sheet image read by the read section 106. If it contains data that prohibits erasing, the paper feeding control section 700 transports the sheet to the reject tray 112.

Before the erasing processing, it is possible to determine whether the read section 106 will execute read of the image, whether the erasing processing is to be carried out, whether the separating processing is to be carried out, and whether the automatic paper feeding processing is to be carried out.

Selection of the various processings can be set by the operation section 128 of the erasing device 100. Here, selection is not limited to the operation section 128 of the erasing device 100. It may also be set on an external terminal. The paper feeding processing, read processing, erasing processing, separating processing, and the pre-separating processing can be combined appropriately and selected by the operation section 128 or the like. In this embodiment, when the processes are combined, the erasing device 100 can execute the processes with the priority order of paper feeding processing, read processing, erasing processing, and separating processing. In addition, the read processing and the pre-separating processing may be taken to have the same priority.

For example, when the read processing, erasing processing and separating processing are selected, the erasing device 100 may carry out the processes in the following order: the read processing by the read section 106, the erasing processing by the erasing section 108, and the separating processing by the read section 106.

That is, before the image on the sheet is erased by the erasing section 108, the read section 106 reads the image on the sheet, and, after the image on the sheet is erased by the erasing section 108, the image of the erased sheet is read by the read section 106.

When the pre-separating processing, the erasing processing and the separating processing are selected, the erasing device 100 carries out the following processes in order: the pre-separating processing by the read section 106, the erasing processing by the erasing section 108, and the separating processing by the read section 106.

When the read processing and the pre-separating processing are selected on the basis of the data read by the read section 106, the erasing device 100 carries out both the read processing and the pre-separating processing on the basis of the printing rate at the same time.

Here, for the erasing device 100, there is no special limitation on the processing, as long as the user can make an appropriate selection. For example, one may also adopt an arrangement in which the erasing device 100 has a processing mode that has the combination predetermined, and the arrangement allows the user to select its processing mode. On the basis of the selected processing, the paper feeding control section 700 of the erasing device 100 can appropriately change the sheet transporting passage.

Based on the signal from the detecting section 212, the paper feeding control section 700 controls the operations of the various sections inside the device. The detecting section 212 has the following sections as shown in FIG. 1: the paper feeding start detecting sensor 103, the temperature sensors 1091 and 1092, and the sheet detecting sensors 130, 131, 132, 133, 134 and the like. Based on the signal from the paper feeding start detecting sensor 103, the paper feeding control section 700 determines a presence/absence of sheet on the paper feeding tray 102. In addition, the paper feeding control section 700 uses the temperature sensors 1091 and 1092 to detect the temperatures of the heating sections of the erasing units 1081 and 1082, while controlling the temperatures of the heating sections in the erasing units 1081 and 1082. In addition, the control section 200 uses the sheet detecting sensors 130, 131, 132, 133, and 134 to determine the positions of the sheets in the first transporting passage 118, the second transporting passage 120 and the third transporting passage 122. For example, the paper feeding control section 700 uses the sheet detecting sensor 130 near downstream the read section 106 to detect the sheet that has passed the read section 106.

The memory section 500 stores the application programs and OS. The application programs include the programs for executing the read function of the read section 106, the erasing function of the erasing section and other functions of the erasing device. The application programs also include an application for a Web client (Web browser) and/or other applications. The memory section 500 stores the image read by the read section 106. In addition, the memory section 500 stores the number of sheets processed in the erasing device 100. For example, the memory section 500 may be a hard disk driver, or other magnetic memory device, an optical memory device, a flash memory or other semiconductor device, as well as any of their combinations.

In the following, the embodiment of the present invention will be explained.

When a blue image is read using a light source comprising red, green and blue LED light sources, the constitution is such that the blue LED light source is turned off, while the red and green LED light sources are kept on for reading. With this arrangement, because the blue component does not enter the image sensor, it is possible to obtain a monochromic image darker than that read by a light source comprising red, green and blue (three-color) LED light sources.

Figure 4:
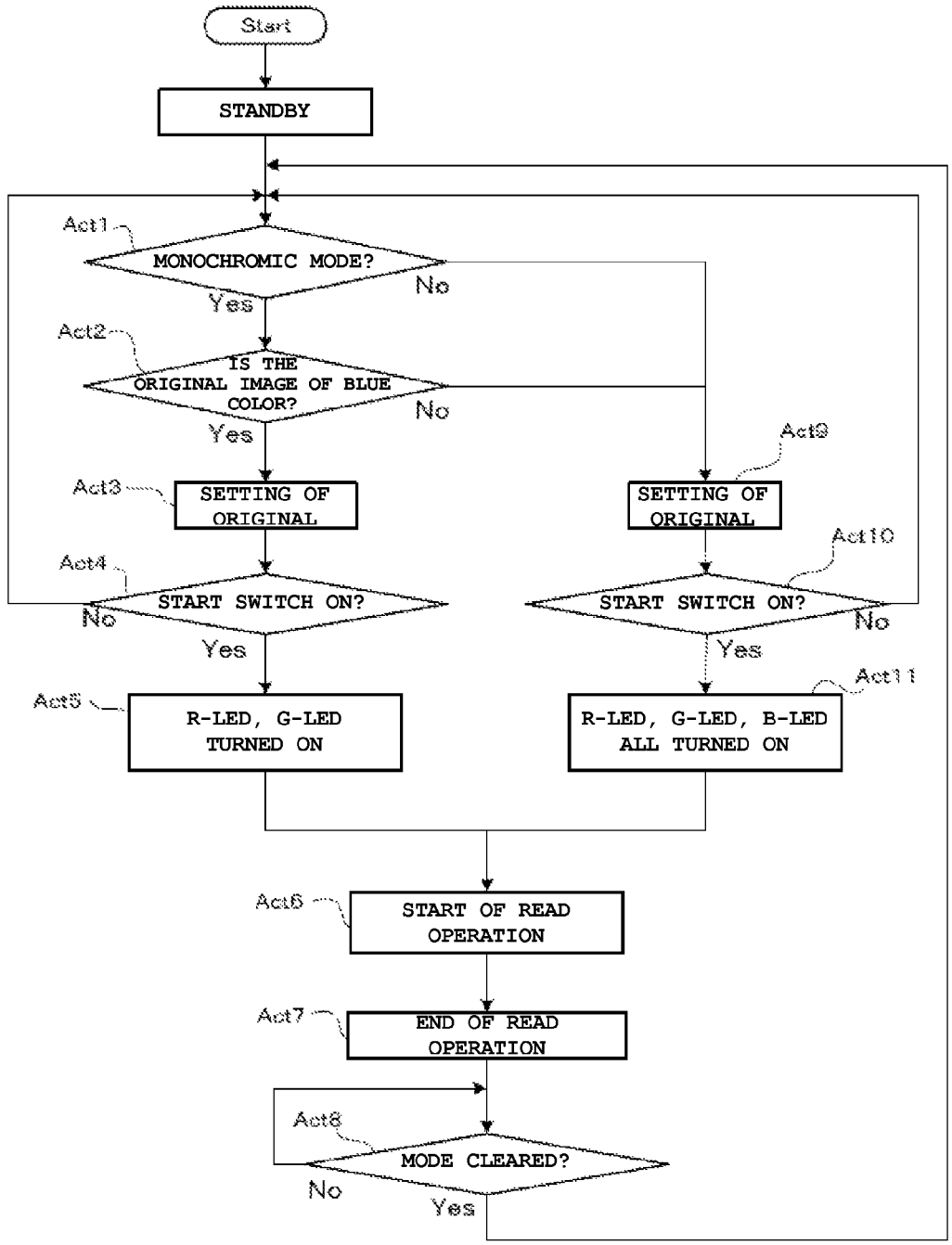
FIG. 4 is a flow chart illustrating an image read processing operation, according to the embodiment.

As an application example, the case of read of a blue monochromic original will be explained with reference to the flow chart of FIG. 4. Here, the image read mode can be selected as either the color mode or the monochromic mode (Act 1). In the monochromic mode, selection is made on whether the original is of blue color (Act 2). Then, the original is set (Act 3). The image read operation is started (Act 4). When the blue original is selected, the red and green LED light sources are turned on as the light source for reading the image (Act 5). Then, the read operation is started (Act 6). In this case, because the blue LED light source is not turned on, no blue component of light can enter the image sensor. Consequently, it is possible to obtain a monochromic image darker than that read with the three-color (red, green, and blue) light source. After end of read (Act 7), the mode is cleared and the apparatus stands by (Act 8).

On the other hand, when the color mode is selected as the image read mode (Act 1), or when the original is not blue (Act 2), as the copy button is pressed, the three-color (red, green, and blue) light source is turned on to read the image (Act 11), so that the blue component of light is also acquired by the image sensor for the obtained image.

Figure 2:
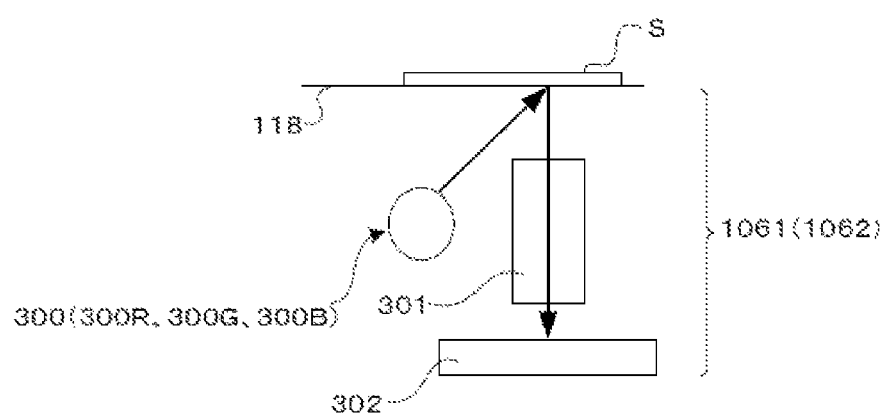
FIG. 2 is a schematic diagram illustrating the first image read unit shown in FIG. 1.

FIG. 2 is a schematic diagram illustrating an arrangement of the first read unit 1061 (and second read unit 1062) of the read section 106. Here, the first read unit 1061 and the second read unit 1062 have the same components. Each of them has an illuminating section 300 equipped with an LED (Light Emitting Diode) light source for illuminating the image surface of the sheet (original) S, a color image sensor 302, and an imaging lens 301 that forms the image light reflected from the image surface of the sheet S as an image on the color image sensor 302.

The illuminating section 300 has a red LED light source 300R, a green LED light source 300G, and a blue LED light source 300B integrated with each other, and it allows the red LED light source 300R, the green LED light source 300G and the blue LED light source 300B to be turned on/off individually.

Figure 3:
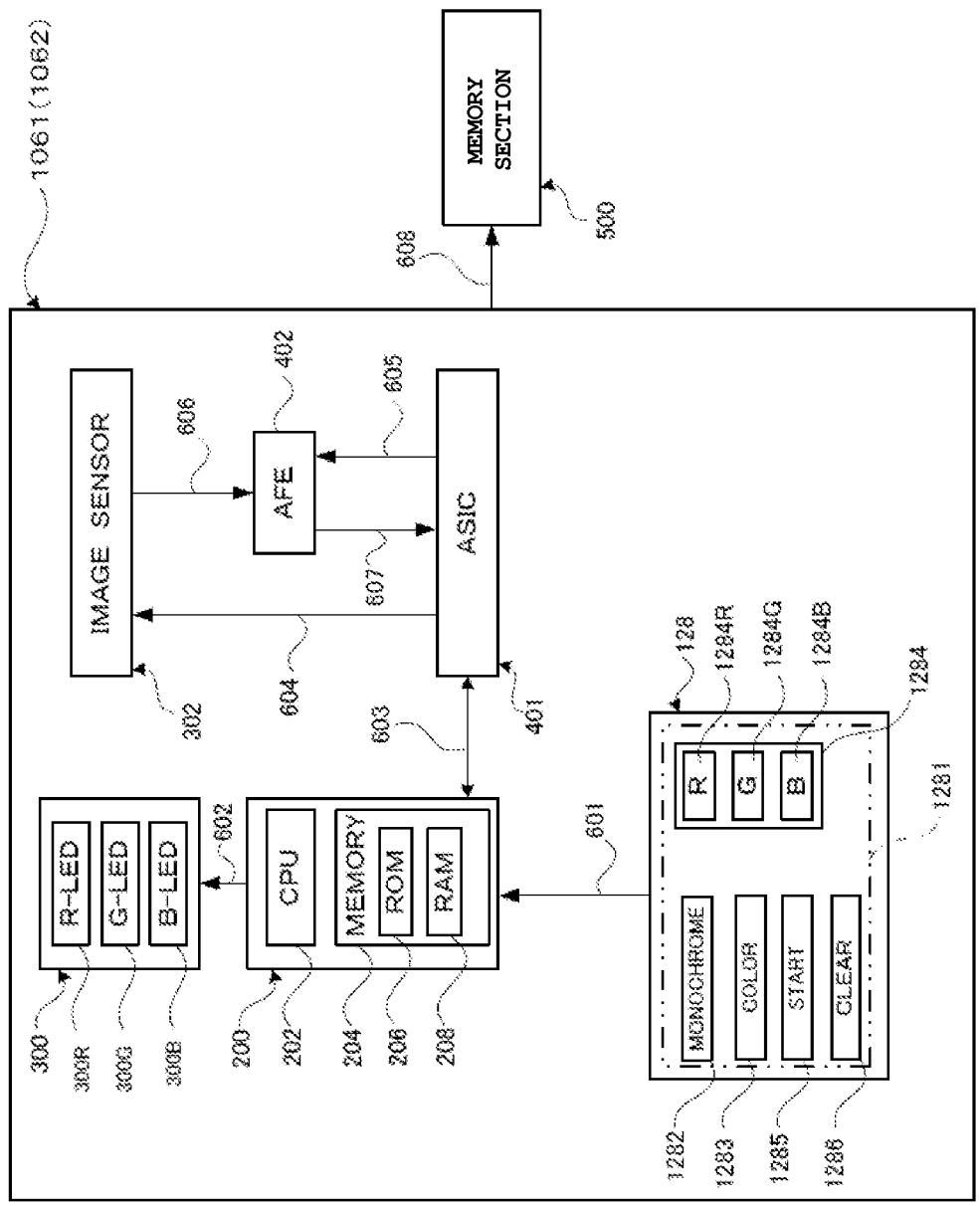
FIG. 3 is a block diagram illustrating a hardware arrangement of the first read unit.

FIG. 3 is a block diagram illustrating the hardware arrangement of the first read unit 1061 of the read section 106. The hardware constitution of the second read unit 1062 is the same.

As shown in FIG. 3, the first read unit 1061 has a control section 200 for image processing, an ASIC section 401 as the image processing circuit section, an AFE section 402 (Analog Front End) as an A/D converter, a color image sensor 302 made of a CCD or the like, and the illuminating section 300 having an LED light source.

The color image sensor 302 has a red light receiving section that receives the red light, a green light receiving section that receives the green light, and a blue light receiving section that receives the blue light. For example, when the color of the original image is blue, the light at the blue wavelength of the white light source of the illuminating section 300 is reflected from the original image and it then goes through the blue filter of the blue light receiving section and is received, while in the red light receiving section and the green light receiving section, the blue component of the original image is cut off and cannot be received. Consequently, in the blue light receiving section, the original image is seen as in white color, while it is seen as black in the red light receiving section and the green light receiving section.

The control section 200 (controller) includes a processor 202 made of a CPU (Central Processing Unit) or MPU (Micro Processing Unit), and a memory 204.

Here, the memory 204 is, for example, a semiconductor memory, and it includes a ROM (Read-Only Memory) 206 that stores various types of control programs, and a RAM (Random Access Memory) 208 that provides a temporary operation area for the processor 202.

As shown in FIG. 3, the operation section 128 sends a signal to the touch panel-type display section to display the selection image 1281 of the output image mode. Displayed on the selection image 1281 are the monochromic output switch section 1282, the color output switch section 1283, the image printing color setting section 1284, the start switch 1285, and the mode clear switch 1286. Displayed in the image printing color setting section 1284 are, for example, the red switch section 1284R that selects the red color, the green switch section 1284G that selects the green color, and the blue switch section 1284B that selects the blue color as an image printing color.

Based on the switch-on signal generated in the select operation on the selection image 1281 of the operation section 128, the control section 200 controls the illuminating section 300 and the ASIC section 401, and it starts read as the start switch 1285 is turned on.

The operation section 128 outputs to the control section 200 the mode select signal 601 including the output image color signal that determines the output image of either the monochromic output or the color output, and the color information select signal that indicates the printing color of the original image.

Based on the mode select signal 601, the control section 200 outputs to the LED illuminating section 300 the LED light source ON signal 602 that individually controls on/off of the red LED light source 300R (R-LED), the green LED light source 300G (G-LED) and the blue LED light source 300B (B-LED) that form the LED illuminating section 300.

When the control section 200 turns on the monochromic output switch section 1282, it outputs an ON signal 602 to the illuminating section 300, which in turn, turns on the 2-color LED light sources of the illuminating section 300 and excluding the LED light source corresponding to the printing color of the original image selected by the image printing color setting section 1284. Here, explanation is made for the case when the other 2-color LED light sources are turned on simultaneously. However, an arrangement may be adopted in which they are turned on alternately when the image of one line is read.

When the color output switch section 1283 is turned on, it outputs the LED light source ON signal 602 that turns on all of the color LED light sources of the illuminating section 300. Conversely, when the monochromic output switch section 1282 is turned on (for example, when the blue switch section 1284B is turned on), the LED light source ON signal 602 output to the illuminating section 300 turns on the R-LED 300R and G-LED 300G, and the signal 602 turns off the B-LED 300B.

By the mutual communication of the read control signal 603 between the control section 200 and the ASIC section 401, the ASIC section 401 outputs the image control signal 604 to the color image sensor 302. In addition, the ASIC section 401 outputs the AFE control signal 605 to the AFE section 402.

The color image sensor 302 outputs the read analog image data 606 to the AFE section 402, and the AFE section 402 outputs the digital image signal 607 to the ASIC section 401. The ASIC section 401 has the digital image signal 607 processed to the R, G, B image data 608 that is then stored in the memory section 500. Here, explanation has been made with respect to the case when the color image sensor 302 uses the 3-line R, G, B CCD sensor. However, it may also use a 4-line sensor also having a monochromic sensor.

The reflected light received by the various R, G, B light receiving sections of the color image sensor 302 does not contain the component of one color among the R, G, B. For example, in the case when a blue original image is illuminated as the R-LED 300R and G-LED 300G are turned on while the B-LED 300B is turned off, the blue light receiving section does not receive the reflected image light of the blue component, and it receives the reflected image light of the red and green components.

Suppose the B-LED 300B is turned on. In such a case, the blue light that illuminates the blue image is received by the blue light receiving section. However, for the red light receiving section and the green light receiving section, as the blue image light is cut off, the light of the original image is not received. Consequently, when the images output from the 3-color light receiving sections are processed to form a monochrome image, the blue light receiving section outputs the white original image data, and the red light receiving section and the green light receiving section output the black original image data. Here, as these original image data are synthesized, a grey image is output. As a result, a poor image would be obtained.

On the other hand, according to the present embodiment, the blue light source is turned off, and the blue light receiving section cannot recognize the original image. As a result, as the synthetic image data does not contain the white color, a clear black image is output.

According to the present embodiment, as the monochromic output switch section 1282 is turned on, the read control signal 603 that carries out monochrome image output is output from the control section 200 to the ASIC section 401.

Consequently, the illuminating section 300 turns off the LED light source in a color corresponding to the selected printing color of the original image, while it turns on the remaining 2-color LED light sources to illuminate the surface of the original. In addition, the color image sensor 302 outputs the read analog image signal 606 from the R, G, B light receiving sections to the AFE section 402, and it outputs the R, G, B color digital image signal 607 from the AFE section 402 to the ASIC section 401.

When the read control signal 603 from the control section 200 instructs output of the monochrome image, the ASIC section 401 carries out an image processing so that the digital image signals from the R, G, B light receiving sections are combined to form the monochrome image.

The image processing to form the monochrome image is carried out by, for example, binarization processing. For example, according to the binarization processing, for an image converted to a multi-tone, such as 256-tone, digital form, the color is taken as black when the tone value is over a preset threshold, and the color is taken as white when the tone value is lower than the preset threshold.

For example, when the color of the original image is blue, and the read image is output as a monochrome image, the illuminating section 300 turns off the B-LED 300B and turns on the R-LED 300R and the G-LED 300G to illuminate the surface of the original. That is, instead of illumination with a monochromatic light source in the color equal or similar to the color of the original image, the surface of the original is illuminated by a monochromatic light source in another color, and the reflected light is read by the color image sensor 302. Consequently, the original image is not recognized as a white image at the light receiving section that receives the light in the prescribed color. Consequently, it is possible to obtain a monochrome image darker than that when all of the R-LED 300R, G-LED 300G and B-LED 300B are turned on for illumination, and a color image sensor is used for reading.

For the monochrome image, by illumination using the R-LED 300R and G-LED 300G, followed by reading the reflected image and then binarization processing, it is possible to obtain a vivid monochrome image.

On the other hand, when the read image is output in full color, the control section 200 controls so that all of the LED light sources of the illuminating section 300 are turned on, and the ASIC section 401 has all of the light receiving sections of the color image sensor 302 receive the light. The obtained read analog image data 606 in various colors are output to the AFE section 402. The ASIC section 401 then carries out processing to obtain the full-color R, G, B image data 608 that is stored in the memory section 500.

In the following, the image read processing operation of the read section 106 will be explained with reference to the flow chart shown in FIG. 4.

While the erasing processing is in the standby mode, determination is made on whether the output mode of the read image is of the monochromic mode (Act 1). If the output mode is the monochromic mode (Yes), it goes to Act 2. If the output mode is not the monochromic mode (No), it goes to Act 9.

In Act 2, a determination is made on whether the blue switch section 1284B is turned on, that is, determination is made on whether the original image color is blue. If the original image is in blue color (Yes), it goes to Act 3.

If the image printing color setting section 1284 is not selected, it is determined that the original is a conventional original printed with the conventional coloring material instead of the recording coloring material, and it goes to Act 9.

In Act 3, the original is set on the paper feeding tray 102, and it then goes to Act 4.

In Act 4, determination is made on whether the start switch 1285 is ON. If it is ON (Yes), it goes to Act 5. If it is not ON (No), it returns to Act 1.

In Act 5, the R-LED 300R and G-LED 300G are turned on, and it goes to Act 6.

In Act 6, the read operation is started, and the originals stacked on the paper feeding tray 102 are sequentially fed to the read section 106, until the read operation comes to an end for all of the originals (Act 7).

After end of the reading operations for all of the originals in Act 7, the read section 106 waits for automatic clearing of the mode selected on the selection image 1281 of the operation section 128 or ON of the mode clear switch 1286 of the operation section 128. If the mode is cleared in Act 7 (Yes), it returns to Act 1, and the mode is selected on the selection image 1281 of the operation section 128 for the next round of the erasing processing.

If the color mode is selected (i.e., NO in Act 1) or if the original image color is not blue in monochromatic mode (i.e., NO in Act 2), the original is set on the paper feeding tray 102 (Act 9), and processing proceeds to Act 10.

In Act 10, determination is made on whether the start switch 1285 is ON. If it is ON (Yes), processing goes to Act 11. If the switch 1285 is not ON (No), processing returns to Act 1.

In Act 11, the R-LED 300R, the G-LED 300G and the B-LED are turned on, and processing proceeds to Act 6, and the read image is output as a color image.

In the embodiment, the case when the image reading apparatus is adopted in a erasing device is explained as an example. However, the image reading apparatus may also be adopted in the MFP (Multi Function Peripheral).

In the example, the original image color is blue. However, this is merely an example, and it may also be other colors. In addition, instead of an integrated light source of R, G, B LED light sources, the illuminating section 300 may also be formed by setting the light sources individually.

The image read by the read section 106 is stored in the memory section 500 of the erasing device 100 in the example. However, the present disclosure is not limited to the scheme. For example, the image may also be stored in the memory section of the external equivalent, such as a user terminal (Personal Computer) or a composite unit, or by communicating with a server via a communication interface. The image data stored in the external equipment may be read from the operation section of the composite unit or the user terminal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reading apparatus comprising:
    an illuminating section comprising a red light source, a green light source and a blue light source, each of which are configured to be turned on individually to illuminate a surface of a original;
    a control section configured to control the light sources so that one of the red, green and blue light sources is turned off, while the remaining light sources are turned on;
    an operation section configured to signal a color of a toner image on the original to the control section, whereby the control section controls the light sources based on the image color of the toner image; and
    an image processing section configured to process, into a monochromatic image, light from the turned-on light sources that is reflected off of the original and received by an image sensor.

2. The image reading apparatus according to claim 1, wherein the control section controls the light sources so that the light source that is most similar to the color of the toner image is turned off.

3. The image reading apparatus according to claim 1, further comprising a touch panel configured to accept an input signal of the color of the toner image from a touch panel.

4. The image reading apparatus according to claim 1, further comprising:
    a memory section configured to store the monochromatic image received by the image processing section.

5. The image reading apparatus according to claim 1, wherein
    the image sensor includes at least a red light receiving section, a green light receiving section and a blue light receiving section, and
    the image processing section performs binarization processing of the light received in the red light receiving section, the green light receiving section and the blue light receiving section to form the monochromatic image.

6. The image reading apparatus according to claim 1, wherein:
    the control section is configured to:
        in a monochrome image read mode, control the light sources so that one of the red, green and blue light sources is turned off, while the remaining light sources are turned on, and
        in a color image read mode, control the light sources o that each of the red, green and blue light sources is turned on; and
    the image processing section, in the color image read mode, process into a color image light from each of the red, green and blue lights that is reflected off of the original and received by the image sensor.

7. The image reading apparatus according to claim 6, further comprising a touch panel configured to accept an input signal selecting the monochrome image read mode or the color image read mode.

8. An erasing device comprising:
    an erasing section configured to erase a toner image printed with an erasable coloring material on an original,
    an illuminating section comprising a red light source, a green light source and a blue light source, each of which are configured to be turned on individually to illuminate a surface of the original;
    a control section configured to control the light sources so that one of the red, green and blue light sources is turned off, while the remaining light sources are turned on;
    an operation section configured to signal a color of the toner image on the original to the control section, whereby the control section controls the light sources based on the color of the toner image; and
    an image processing section configured to process, into a monochromatic image, light from the turned-on light sources that is reflected off of the original and received by an image sensor.

9. The erasing device according to claim 8, wherein the control section controls the light sources so that the light source that is most similar to the color of the toner image is turned off.

10. The erasing device according to claim 8, further comprising a touch panel configured to accept an input signal of the color of the toner image from a touch panel.

11. The erasing device according to claim 8, further comprising:
a memory section configured to store the monochromatic image received by the image processing section.

12. The erasing device according to claim 8, wherein
the image sensor includes at least a red light receiving section, a green light receiving section and a blue light receiving section, and
the image processing section performs binarization processing of the light received in the red light receiving section, the green light receiving section and the blue light receiving section to form the monochromatic image.

13. The erasing device according to claim 8, wherein:
the control section is configured to:
in a monochrome image read mode, control the light sources so that one of the red, green and blue light sources is turned off, while the remaining light sources are turned on, and
in a color image read mode, control the light sources so that each of the red, green and blue light sources is turned on; and
the image processing section, in the color image read mode, process into a color image light from each of the red, green and blue lights that is reflected off of the original and received by the image sensor.

14. The erasing according to claim 13, further comprising a touch panel configured to accept an input signal selecting the monochrome image read mode or the color image read mode.

15. An image reading method comprising:
receiving a signal of a color of a toner image on an original;
based on the received signal of the color of the toner image, controlling an illuminating section comprising a red light source, a green light source and a blue light source so that one of the red, green and blue light sources is turned off, while the remaining light sources are turned on;
receiving, on an image sensor, light from the turned-on light sources that is reflected off of the original, and
processing the light received by the image sensor to form a monochromatic image.

16. The image reading method according to claim 15, wherein the light source that is most similar to the color of the toner image on the original is turned off.

17. The image reading method according to claim 15, further comprising:
accepting an input signal of the color of the toner image from a touch panel.

18. The image reading method according to claim 15, further comprising:
storing the formed monochromatic image.

19. The image reading method according to claim 15, wherein the image sensor includes at least a red light receiving section, a green light receiving section and a blue light receiving section, and
processing the light comprises binarization processing of the light received in the red light receiving section, the green light receiving section and the blue light receiving section to form the monochromatic image.

20. The image reading method according to claim 15, further comprising:
accepting an input signal selecting a monochrome image read mode.

* * * * *